United States Patent
Frota de Souza Filho

(10) Patent No.: US 8,789,257 B2
(45) Date of Patent: Jul. 29, 2014

(54) TOOLHOLDER CONNECTOR AND ASSOCIATED SYSTEM

(71) Applicant: Kennametal Inc., Latrobe, PA (US)

(72) Inventor: Ruy Frota de Souza Filho, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 13/661,271

(22) Filed: Oct. 26, 2012

(65) Prior Publication Data

US 2013/0042462 A1 Feb. 21, 2013

Related U.S. Application Data

(62) Division of application No. 12/625,974, filed on Nov. 25, 2009, now Pat. No. 8,312,615.

(51) Int. Cl.
*B23P 11/00* (2006.01)
*F16B 1/00* (2006.01)

(52) U.S. Cl.
USPC .......................................... 29/525.01; 403/24

(58) Field of Classification Search
USPC ........... 29/525.01, 525.02, 525, 34 R, 50, 53, 29/56.5, 428; 403/24, 324, 287
See application file for complete search history.

(56) References Cited

U.S. PATENT DOCUMENTS

| | | |
|---|---|---|
| 1,050,385 A | 1/1913 | Palmgren |
| 1,994,791 A | 3/1935 | Sanderson |
| 2,485,799 A | 10/1949 | Woytych |
| 2,667,687 A | 2/1954 | Clarkson |
| 3,301,581 A | 1/1967 | Winberg |
| 4,573,824 A | 3/1986 | Ehle |
| 4,575,293 A | 3/1986 | Berti |
| 4,708,040 A | 11/1987 | Erickson |
| 4,715,753 A | 12/1987 | Tack |
| 4,726,268 A | 2/1988 | Erickson |
| 4,736,659 A | 4/1988 | Erickson |
| 4,748,879 A | 6/1988 | von Haas |
| 4,829,862 A | 5/1989 | Keritsis |
| 4,913,607 A | 4/1990 | von Haas |
| 4,945,793 A | 8/1990 | von Haas |
| 4,981,057 A | 1/1991 | von Haas et al. |
| 5,040,932 A | 8/1991 | Oshnock |
| 5,137,401 A | 8/1992 | Muendlein et al. |
| 5,173,017 A | 12/1992 | Oshnock et al. |
| 5,263,351 A | 11/1993 | Berg, III |
| 5,341,710 A | 8/1994 | Peuterbaugh |
| 5,378,076 A | 1/1995 | D'Andrea |
| 5,851,091 A | 12/1998 | Klement |
| 5,873,682 A | 2/1999 | Tripsa |

(Continued)

FOREIGN PATENT DOCUMENTS

| | | |
|---|---|---|
| DE | 3616230 A1 | 11/1987 |
| GB | 2164276 A | 3/1986 |

(Continued)

*Primary Examiner* — John C Hong
(74) *Attorney, Agent, or Firm* — Larry R. Meenan

(57) ABSTRACT

A toolholder connector having one threaded end and one end with a male quick change portion is threadingly engaged with a first toolholder having a threaded bore. The quick change connector also has a male quick change portion that is engaged within a side activated receiver of a second toolholder. Prior to activating the receiver, an alignment pin associated with the first toolholder is lined up with alignment slot associated with the second toolholder such that when the two are brought together, a pre-determined radial alignment will be retained.

6 Claims, 8 Drawing Sheets

(56) References Cited

U.S. PATENT DOCUMENTS

| | | |
|---|---|---|
| 5,938,377 A | 8/1999 | Jordberg et al. |
| 6,109,152 A | 8/2000 | Hecht |
| 6,270,293 B2 | 8/2001 | Erickson et al. |
| 6,415,696 B1 | 7/2002 | Erickson et al. |
| 6,786,119 B1 | 9/2004 | Erickson et al. |
| 6,966,728 B1 | 11/2005 | Erickson |
| 7,240,594 B2 | 7/2007 | Erickson et al. |

FOREIGN PATENT DOCUMENTS

| | | |
|---|---|---|
| JP | 61071904 A | 4/1986 |
| JP | 2657425 B2 | 9/1997 |
| KR | 10-2002-0043212 A | 6/2002 |
| WO | 94/22623 A1 | 10/1994 |

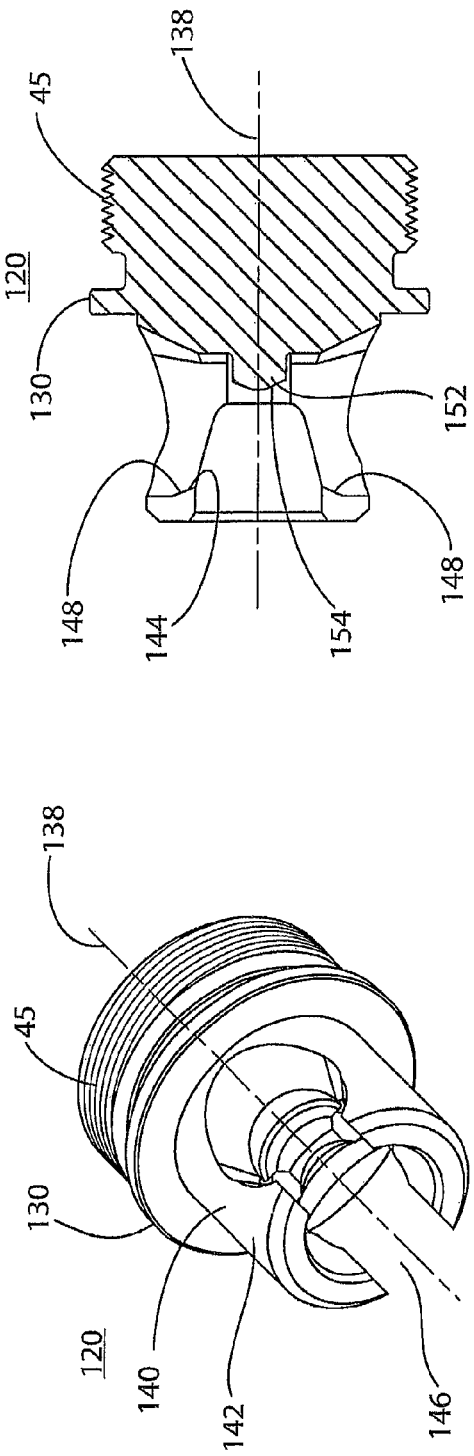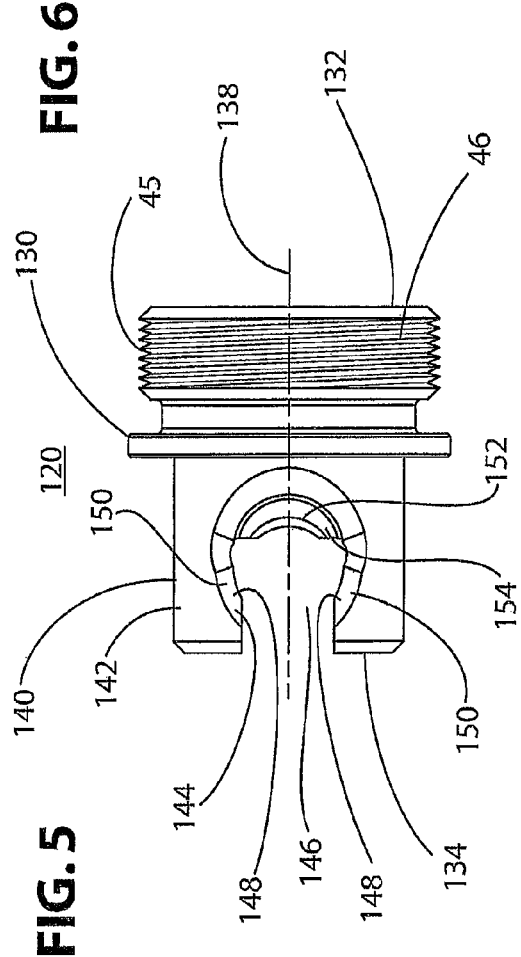

US 8,789,257 B2

TOOLHOLDER CONNECTOR AND ASSOCIATED SYSTEM

BACKGROUND OF THE INVENTION

1. Field of the Invention

The invention is directed to tooling for machining operations and, more particularly, directed to a connector for securing a toolholder to a toolholder support member.

2. Description of Related Art

FIGS. 1-3 illustrate prior art designs, whereby a first toolholder 10 is secured within a second toolholder 15 utilizing a differential connector 20. The second toolholder 15, which is a tapered adapter, is mounted within a machine tool (not shown). The first toolholder 10 includes a cutting insert 25 typically used for boring operations. For boring operations or any operation wherein the cutting insert 25 must be located with precision, the mating of the first toolholder 10 and second toolholder 15 becomes critical and this is especially true with respect to the rotational orientation of the first toolholder 10 relative to the second toolholder 15. To ensure a precise radially relationship between the first toolholder 10 and the second toolholder 15, an alignment pin 30 protruding from the face 37 of the first toolholder 10 must mate with an alignment slot 35 in the face 39 of the second toolholder 15. Threads 40 on the differential connector 20 engage matching threads 41 within the second toolholder 15, while threads 45 engage matching threads 47 within the bore 48 of the first toolholder 10. The threads 40 and the threads 45, along with their respective matching threads 41, 47, have different pitches so that rotation of the differential connector 20 draws the first toolholder 10 into or away from the second toolholder 15. Once the threads are engaged, then by rotating the differential connector 20, the first toolholder 10 is drawn into the second toolholder 15. However, in order to engage the alignment pin 30 within the alignment slot 35, it is necessary to advance the differential connector 20 when the first toolholder 10 is very close to the second toolholder 15 and when the alignment pin 30 is lined up with the alignment slot. It is furthermore necessary to access the differential connector 20 through the bore 50 extending though the toolholder 15 to access a hex 52 within the first end 22 of the differential connector 20.

However, with this arrangement, when the first toolholder 10 must be removed from the second toolholder 15, access is required through the bore 50 to rotate the differential connector 20 to separate the first toolholder 10 from the second toolholder 15. The current design requires a particular wrench that is introduced from the back of the second toolholder 15 through the bore 50 to engage the differential connector 20 and to release the first toolholder 10.

A design is desired to not only eliminate the need to access a differential connector 20 through a bore 50 extending through the second toolholder, but furthermore, an arrangement is desired to make easier the positioning of the alignment pin 30 relative to the alignment slot 35 prior to mating the first toolholder 10 to the second toolholder 15.

SUMMARY OF THE INVENTION

A first embodiment of the subject invention is directed to a connector for attaching a first toolholder with a threaded bore to a second toolholder with a side activated receiver comprised of a body having a first end and a second end, a male threaded portion extending axially along a longitudinal axis to the first end adapted to be mated with the first toolholder, and a male quick-change portion adapted to be mated with the second toolholder. The male portion has a shank that extends axially to the second end, wherein the shank has a lockable segment defined by an opening proximate to the second end extending radially therethrough. The opening has a lockable portion with at least one angled forwardly facing surface which may be engaged to secure the quick-change portion rearwardly within the second toolholder.

A second embodiment of the subject invention is directed to a system for coupling a first toolholder having a threaded bore to a second toolholder having a side activated receiver. The system has a connector having a body with a first end, a second end, and a shank therebetween. The connector has a male threaded portion extending axially along a longitudinal axis to the first end, and a male quick-change portion extending axially to the second end. The shank has a lockable segment defined by an opening proximate to the second end extending radially therethrough, wherein the opening has a lockable portion with at least one angled forwardly facing surface. The first toolholder has a threaded first receiving bore, wherein the threaded receiving bore is mateable with the male threaded portion of the connector. The second toolholder has a second receiving bore accepting the male quick-change portion and further including a side activated receiver having a rotatable actuating bolt positioned within the second toolholder along a radial axis (R1) relative to the longitudinal axis. The bolt also has a bolt locking segment defined by at least one angled rearwardly facing surface which translates along the radial axis and contacts the lockable surface of the connector to secure the connector within the second toolholder.

A third embodiment of the subject invention is directed to a side activated extension coupling for connecting a first toolholder having a body extending along a longitudinal axis and having a first end and a second end, and a male quick change portion having a shank that extends longitudinally from the first end. The shank has a lockable segment defined by an opening proximate to the second end extending radially therethrough, wherein the opening has a lockable segment with at least one angled forwardly facing surface. The second toolholder has a receiving bore accepting a male quick change portion extending longitudinally into the second end and further including a side activated receiver comprised of a rotatable actuating bolt positioned within the second toolholder along a radial axis (R1) relative to other longitudinal axis. The second toolholder has a first end with a bolt locking segment defined by at least one angled rearwardly facing surface which translates along the radial axis and contacts the lockable surface of the connector to secure the connector within the toolholder.

A fourth embodiment of the subject invention is directed to a method for attaching a first toolholder having a threaded first receiving bore, wherein the threaded receiving bore is mateable with the male threaded portion of the connector. A second toolholder has a second receiving bore accepting a male quick-change portion and further including a side activated receiver is comprised of a rotatable actuating bolt positioned within the second toolholder along a radial axis (R1) relative to other longitudinal axis. The bolt has a first end with a bolt locking segment defined by at least one angled rearwardly facing surface which translates along the radial axis and contacts the lockable surface of the connector to secure the connector within the toolholder. The method is comprised of the steps of, with a connector having one end with a male threaded portion and another end with a male quick change portion, screwing the male threaded portion partially into the threaded receiving bore of the first toolholder, inserting the male quick-change portion of the connector into the side activated receiver of the second toolholder, rotating a first toolholder relative to the second toolholder to a relative predetermined radial alignment, and activating the quick change locking mechanism to secure the first toolholder to the second toolholder in the predetermined radial alignment.

BRIEF DESCRIPTION OF THE PREFERRED DRAWINGS

Figure 4:
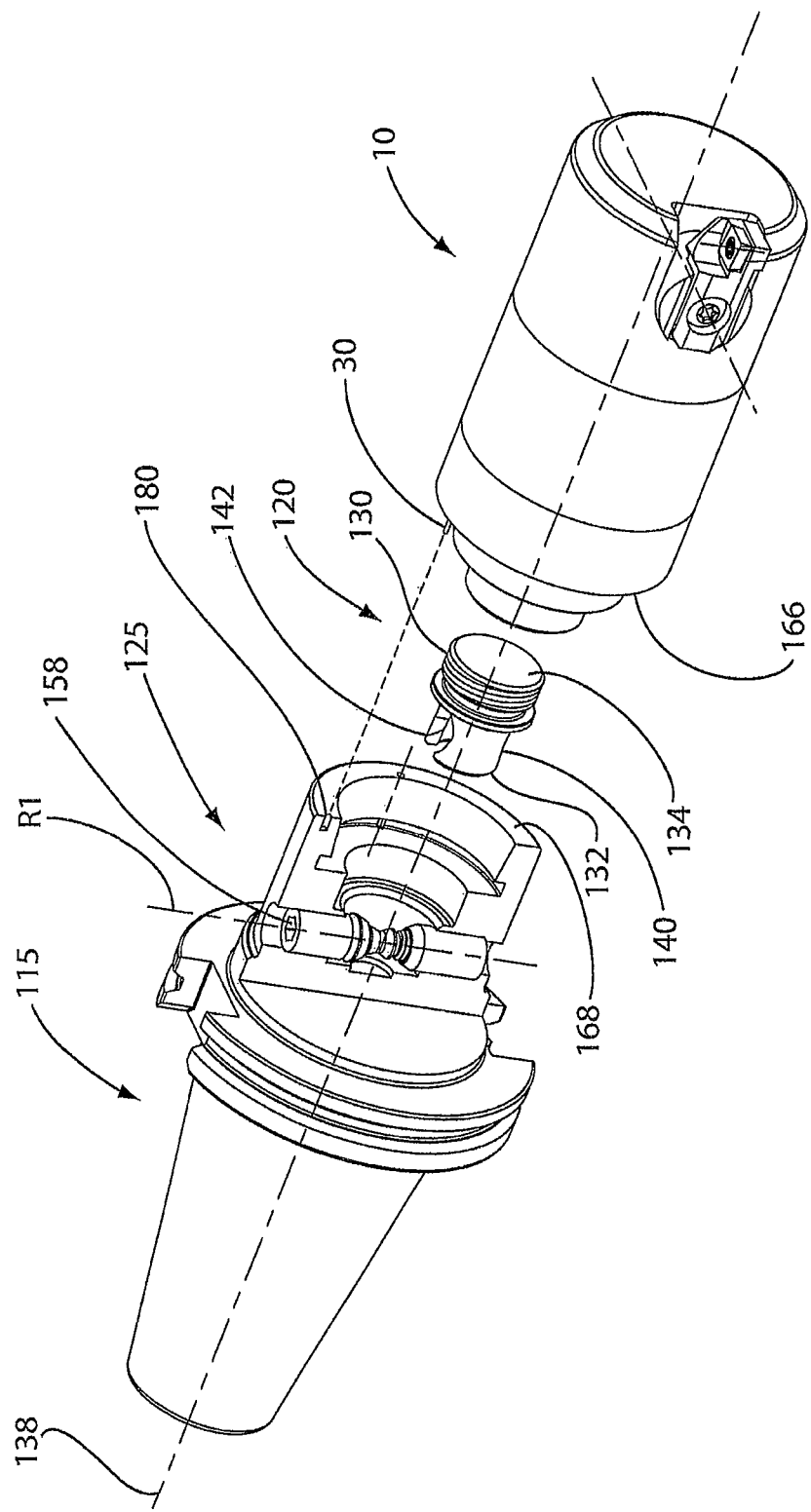
FIG. 4 is an exploded perspective view of the toolholder connector and associated system in accordance with the subject invention.
Figure 8:
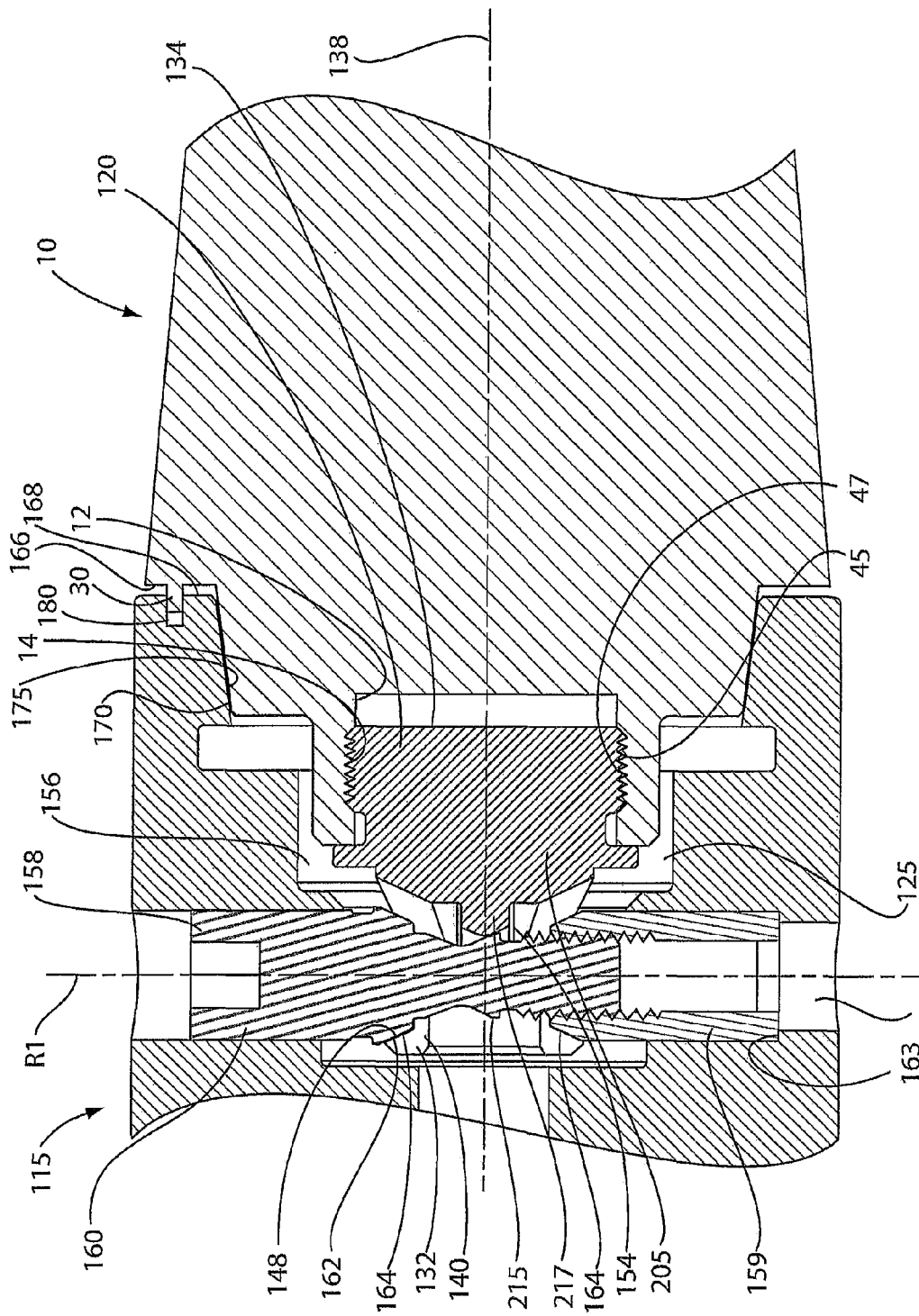

FIGS. 5, 6, and 7 is a perspective view, cross-sectional view, and top view of the toolholder connector in accordance with the subject invention;

FIG. 8 is a partial cross-sectional view of the arrangement illustrated in FIG. 4, whereby the first toolholder and second toolholder are nearly mated and the quick change connector is partially engaged.

Figure 9:
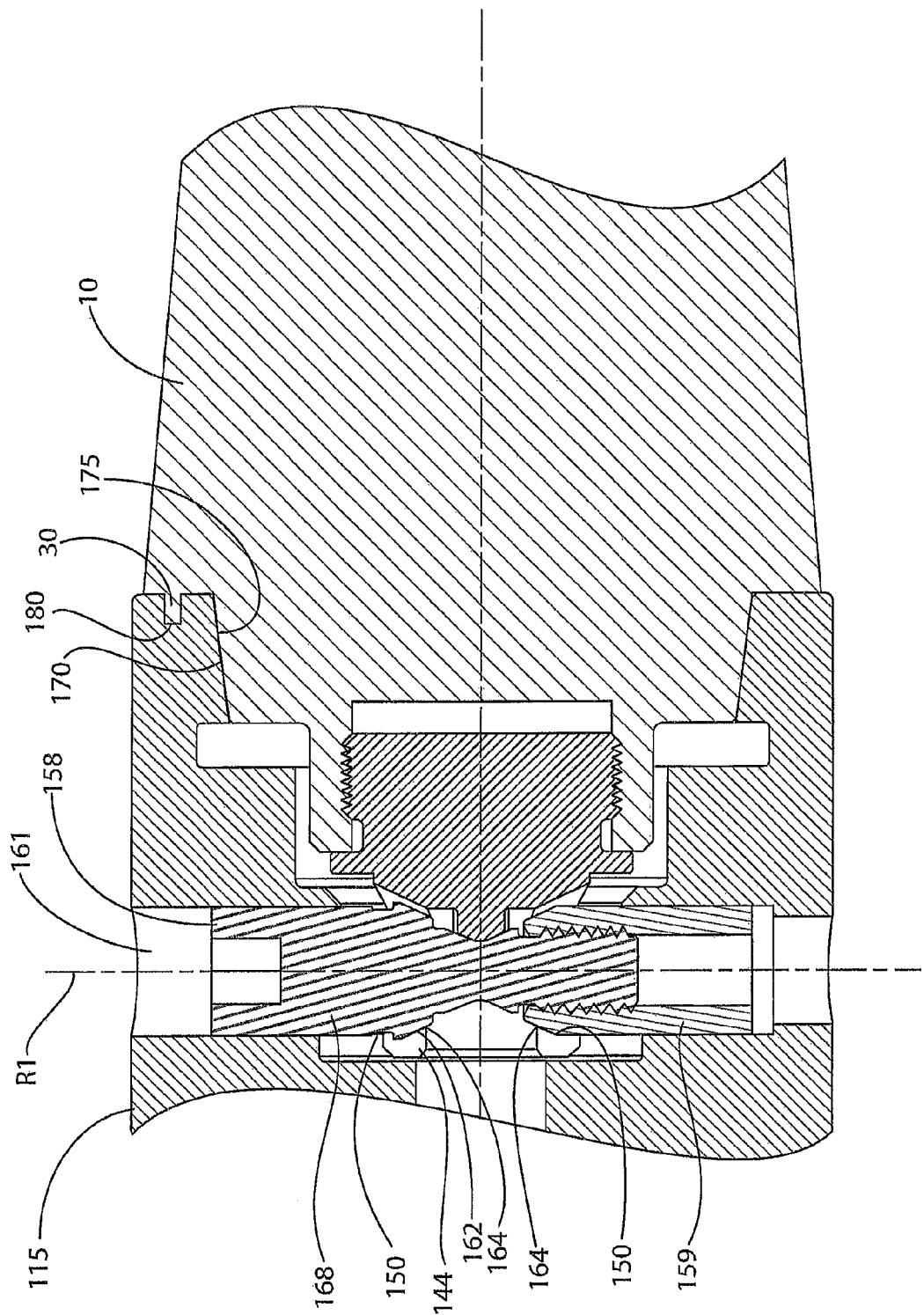
Figure 10:
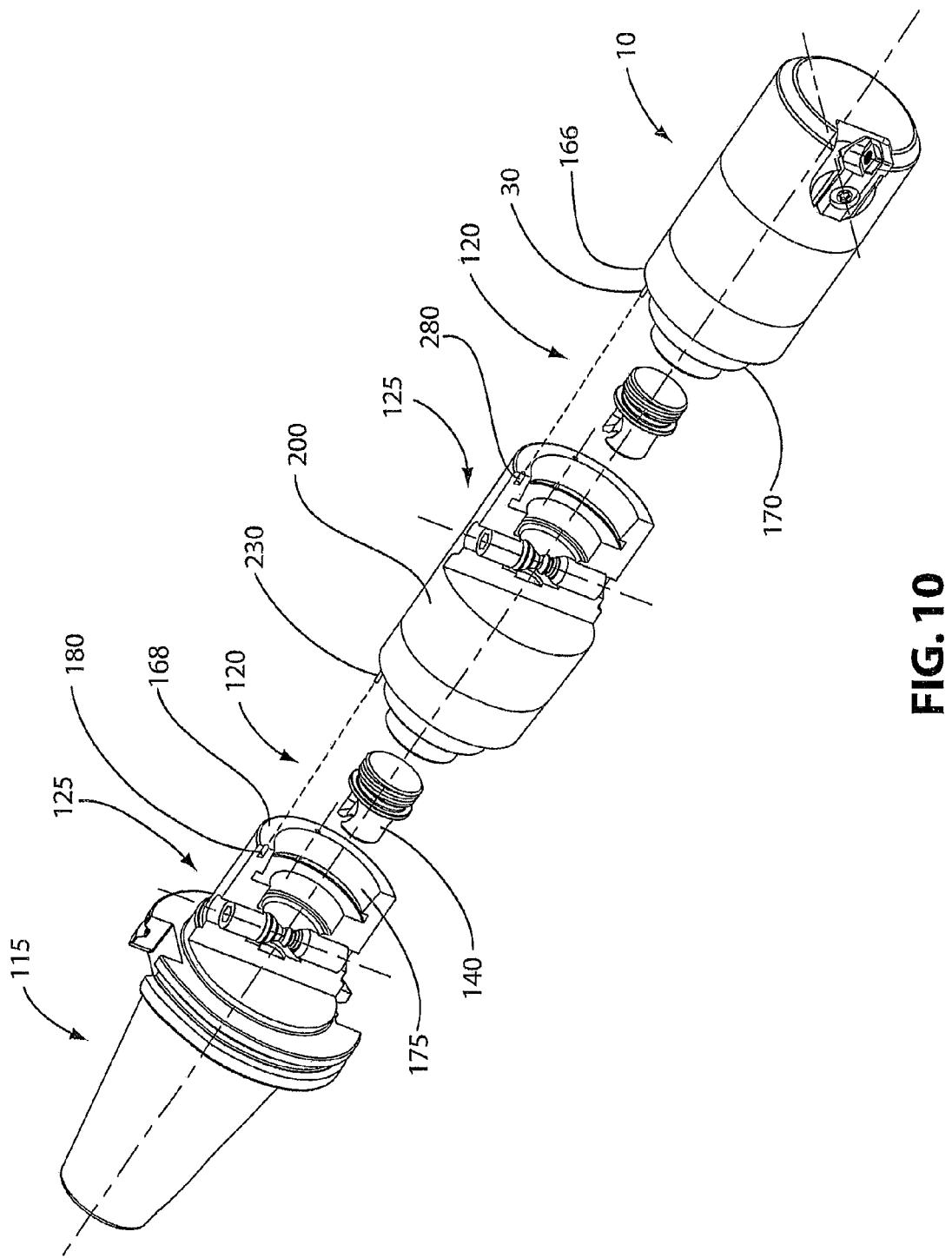

FIG. 9 is a partial cross-sectional view similar to that illustrated in FIG. 8, however, now with the first toolholder and second toolholder fully engaged by the quick change connector; and FIG. 10 is an exploded view illustrating the flexibility of the subject invention, showing multiple toolholders connected using the toolholder connector.

DETAILED DESCRIPTION OF THE INVENTION

Directing attention to FIGS. 4 and 8, a quick change connector 120 is used to attach a first toolholder 10 to a second toolholder 115. The first toolholder 10 has a bore 12 with associated threads 14, while the second toolholder 115 has a side activated receiver.

Directing attention to FIGS. 5-7, the quick change connector 120 is made up of a body 130 having a first end 132 and a second end 134. A male threaded portion 46, having threads 45 similar to the differential connector 20 (FIG. 1) extends axially along a longitudinal axis 138 to the first end 132 and is adapted to be mated with mating threads 47 of the first toolholder 10 (FIG. 8).

A male quick change portion 140 is adapted to be mated with the second toolholder 115 (FIG. 8), wherein the male portion 140 has a shank 142 that extends axially to the second end 134. The shank 142 has a lockable segment 144 defined by an opening 146 proximate to the second end 134 and extending radially therethrough. The opening 146 has a lockable portion 148 with at least one angled forwardly facing surface 150 which may be engaged to secure the quick change portion 140 rearwardly within the second toolholder 115.

In one embodiment, the shank 142 of the male quick change portion 140 is round and the lockable segment 144 has a pair of lockable surfaces 148 at circumferentially spaced locations, as illustrated in FIG. 7. Additionally, the male quick change portion 140 may further include at least one releasable segment 152 defined by at least one angled rearwardly facing surface 154 which may be engaged to eject the quick change portion 140 and thereby, the entire first toolholder 10 from the second toolholder 115.

As illustrated in FIG. 5, the shank 142 of the male quick change portion 140 is not only round, but may be frustoconical in shape. Additionally, the angled forwardly facing surface 150 (FIG. 7) of the opening 146 may be conical.

Directing attention to FIGS. 4, 8, and 9, details by which the quick change connector 120 secures the first toolholder 10 to the second toolholder 115 will be discussed.

The first toolholder 10 has a receiving bore 12 with threads 14, wherein the threads 14 are mateable with threads 47 of the male threaded portion 45 of the quick change connector 120.

The second toolholder 115 has a receiving bore 156 accepting the male quick change portion 140 and further includes a side activated receiver 125 comprised of a rotatable actuating bolt 158 positioned within the second toolholder 115 along a radial axis R1 relative to the longitudinal axis 138. The actuating bolt 158 has a first end 160 and spaced from the first end 160 is a bolt locking segment 162 defined by at least one angled rearwardly facing surface 164. The bolt 158 translates along the radial axis R1 and contacts the lockable surface 148 of the quick change connector 120 to secure the quick change connector 120 within the second toolholder 115.

As illustrated in FIG. 8, the first toolholder 10 has a peripheral mating face 166, wherein the second toolholder 115 also has a peripheral mating face 168, such that when the quick change connector 120 draws the first toolholder 110 against the second toolholder 115, the peripheral mating faces 166, 168 abut with one another. Additionally, the first toolholder may include a conical male portion 170 sized to fit within a conical receiving portion 175 of the second toolholder 115, and the relationship of these two elements may be such that a resilient interference fit is provided between the conical male portion 170 and the conical receiving portion 175.

Figure 1:
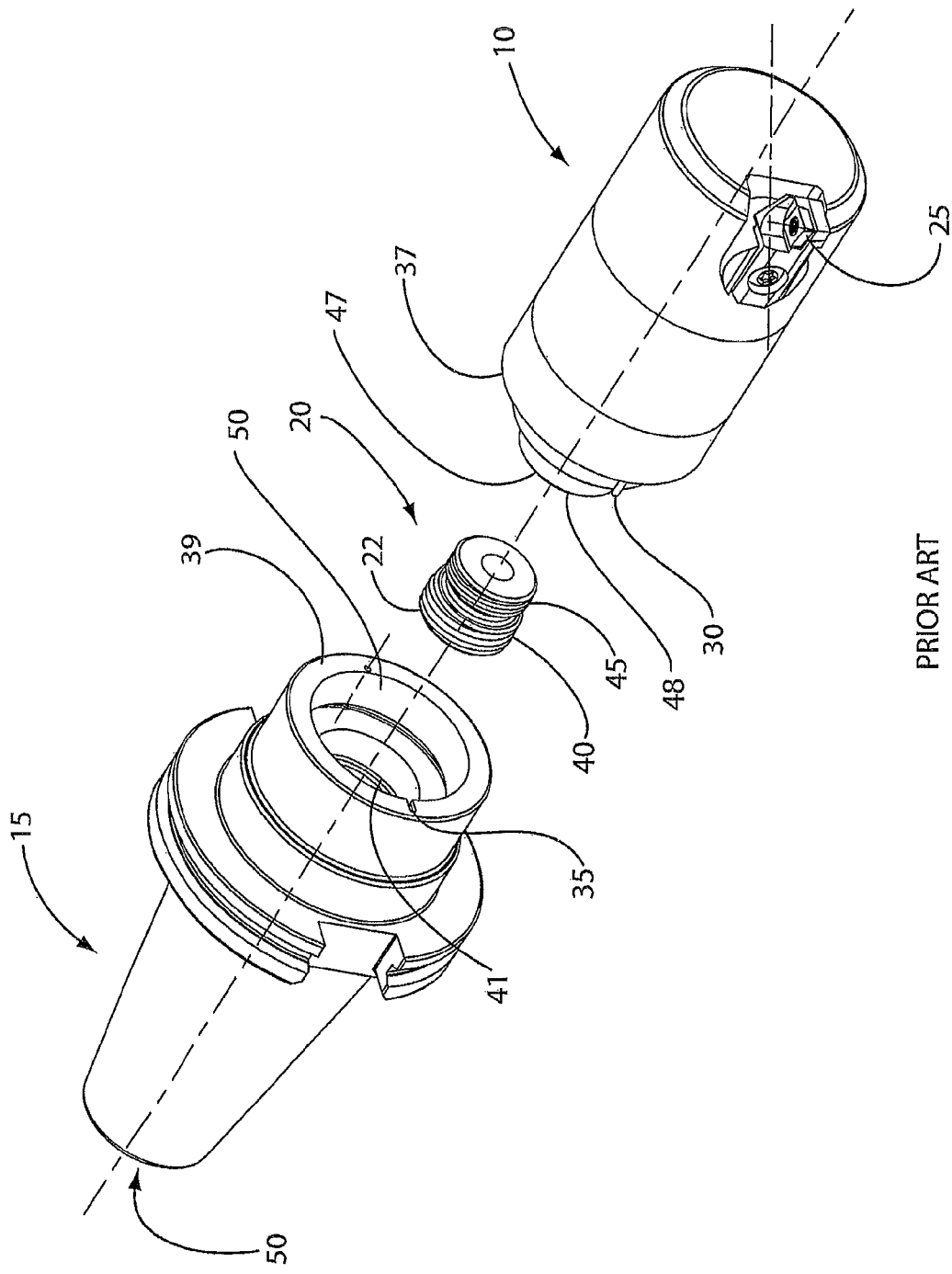
FIG. 1 is prior art and is a exploded view showing the manner by which a differential connector connects a first toolholder with a second holder.
Figure 2:
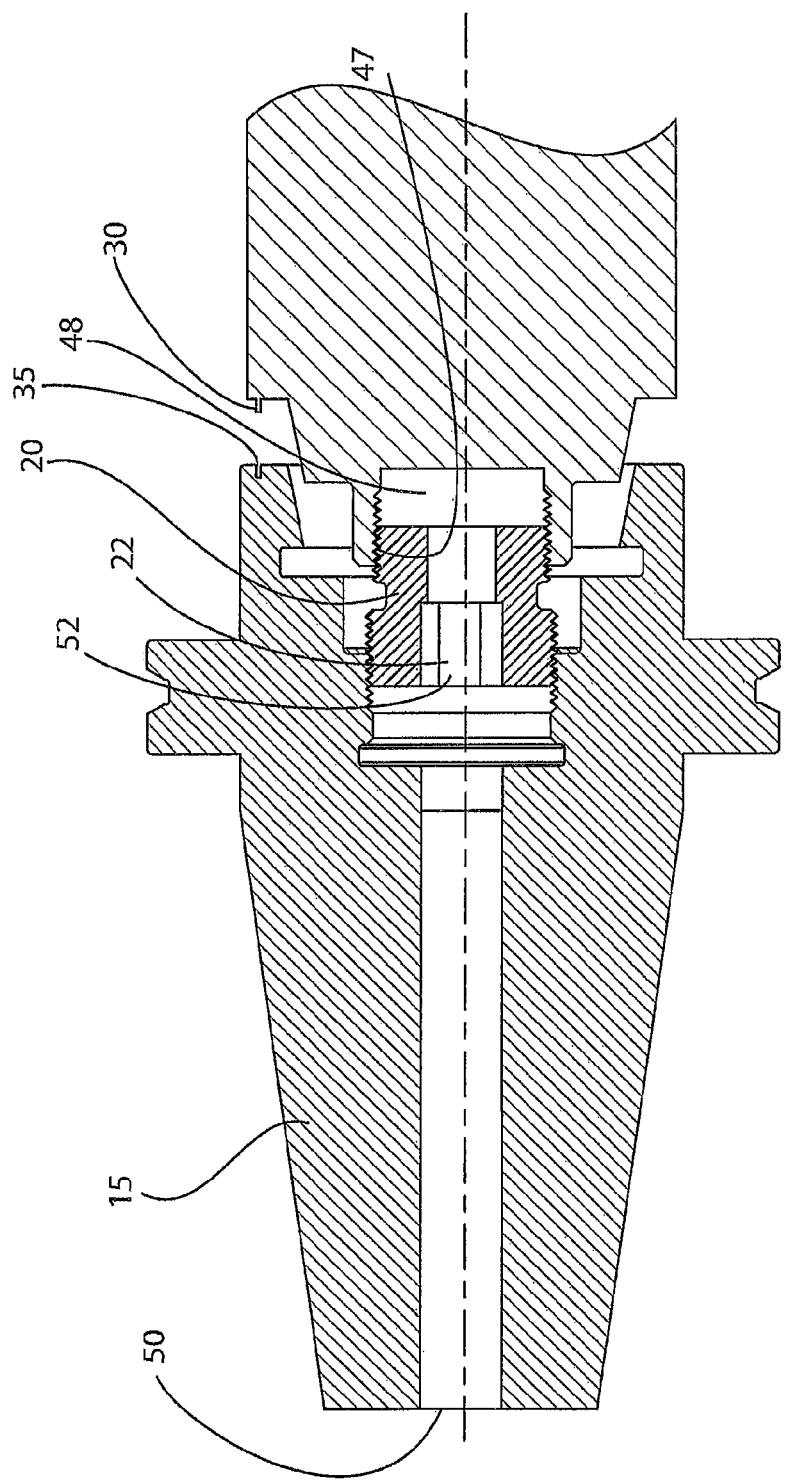
FIG. 2 is prior art and is a cross-sectional view of the arrangement illustrated in FIG. 1 with a differential connector engaging both the first toolholder and second toolholder.
Figure 3:
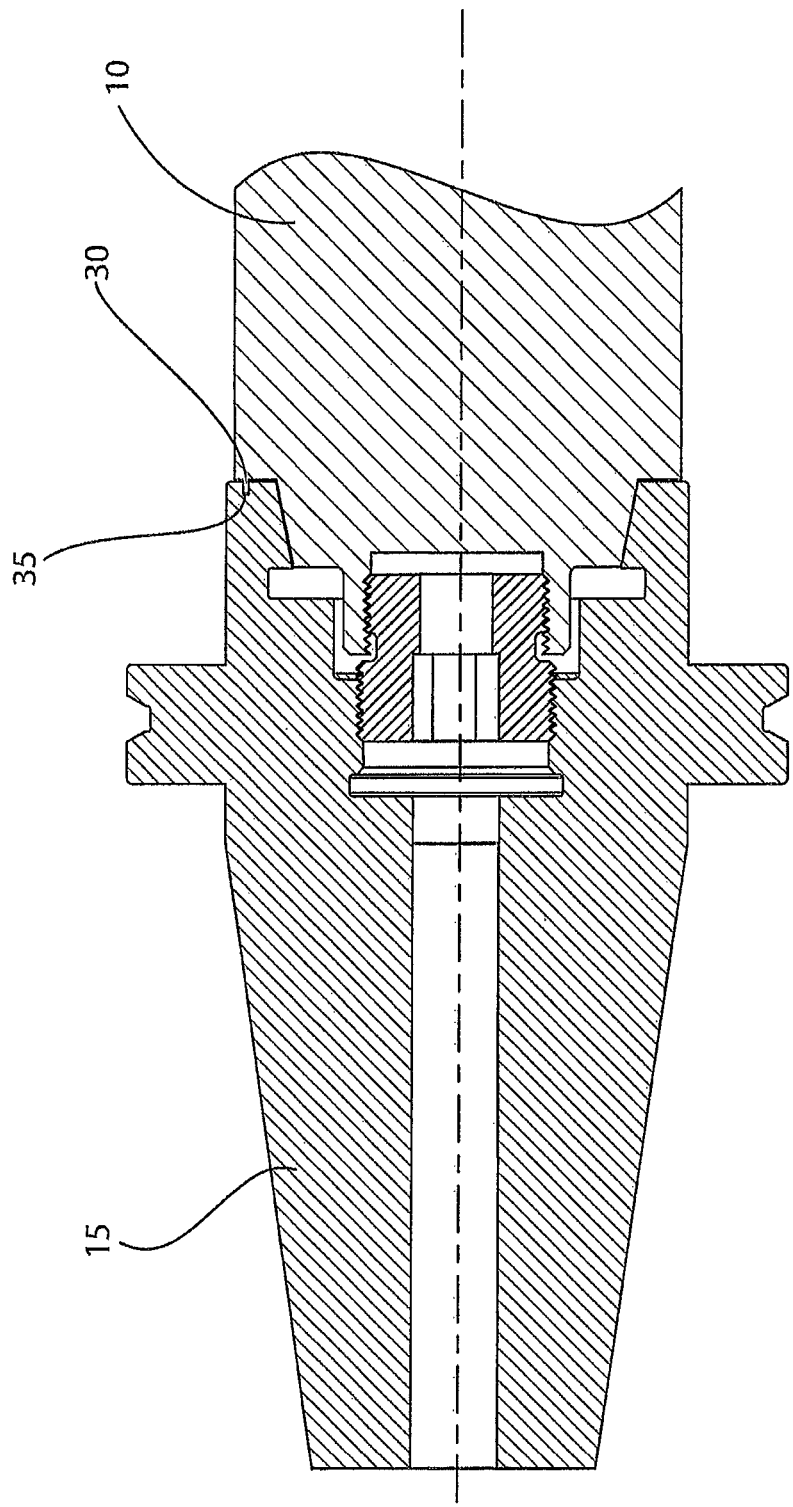
FIG. 3 is prior art and is a cross-sectional view of the arrangement illustrated in FIG. 1 with the first toolholder fully engaged within the second toolholder and secured therein by the differential connector.

One of the problems discussed, with respect to prior art design illustrated in FIGS. 1-3, was aligning the alignment pin 30 within the alignment slot 180 as a differential connector was tightened. The side activated receiver 125 in connection with the quick change connector 120 of the subject invention provides rotational adjustment and longitudinal adjustment, such that the alignment pin 30 of the first toolholder 10 may be easily aligned with an alignment slot 180 of the peripheral mating face 168 of the second toolholder 115. It should be appreciated that, while an alignment pin 30 and alignment slot 180 are illustrated, other longitudinal protrusions then the alignment pin 30 and other longitudinal indentations than the alignment slot 180 may suffice to provide proper radial alignment between the first toolholder 10 and the second toolholder 115. It should also be appreciated that the alignment pin 30 or longitudinal protrusion may extend from the peripheral mating face 168 of the second toolholder 115, while the longitudinal indentation or alignment slot 180 may be positioned within the peripheral mating face 166 of the first toolholder 10.

As illustrated herein, the first toolholder 10 is a boring bar while the second toolholder 115 is a tapered adapter.

As illustrated in FIG. 10, it is entirely possible to introduce an intermediate toolholder, such as the side activated extension coupling 200, by using similar side activated receivers 125 and similar quick change connectors 120 along with mating peripheral faces 166 of the first toolholder 10 and 168 of the second toolholder 115 along with a conical male portion 170 of the first toolholder 10 and the conical receiving portion 175 of the second toolholder 115. With the introduction of multiple intermediate pieces, such as the side activated extension coupling 200, it is possible to align adjacent toolholders with a high level of precision. Furthermore, because each of these arrangements is side activated, the need to activate a differential connection 20 with access through the toolholder longitudinal bores is eliminated. Therefore, it is no longer necessary to assemble or disassemble these components in a required sequential fashion.

While details of the side activated receiver have been described therein, additional details may be found in U.S. Pat. No. 7,240,594 entitled "Toolholder Assembly" herein incorporated in its entirety by reference, is assigned to Kennametal Inc., which is the same Assignee for the present application.

It should be noted that the male quick change portion 140 of the quick change connector 120 may be threadingly attached to the extension coupling 200 or may, in the alternative, be an integral part of the extension coupling 200.

Directing attention to FIG. 1, the first toolholder 10, as illustrated, is a high precision boring tool which, for the most part, is produced with a bore 48 having threads 47 designed to mate with the threads 45 in the differential connector 20. The expense associated with modifying the first toolholder 10 to eliminate these mating threads 47, and include an integral male quick change portion is much greater than merely providing the quick change connector 20 compatible with the toolholder 10 and producing a second toolholder 115 or connector coupling 200 with modifications such as the side activated receiver 125 illustrated in FIG. 10. It is for that reason that the quick change connector 120 is a separate and discrete part from the first toolholder 10, the side activated extension coupling 200, and the second toolholder 115.

Directing attention to FIGS. 8 and 9, in operation, the male quick change portion 205 is placed within the side activated receiver 125 and the rotatable actuating bolt 158, which is threadingly engaged with an actuating bolt nut 159, is rotated such that the first end 160 of the bolt 158 is drawn toward the nut 159. By doing so, the angled rearwardly facing surfaces 164 of the bolt 158 and the nut 159 are drawn together and engage the angled forwardly facing surfaces 150 of the lockable segment 144 of the male quick change portion 140 (FIG. 7). It should be pointed out that the rotatable actuating bolt 158 and bolt nut 159 may float within the bore 158 extending within the second toolholder 115.

As previously mentioned, it is possible that the connection between the first toolholder 10 and the second toolholder 115 may include a resilient interference fit between the conical male portion 170 of the first toolholder 10 and the conical receiving portion 175 of the first toolholder 10. Under these circumstances, it may be necessary to positively displace the first toolholder from the second toolholder 115.

Directing attention to FIG. 8, the rotatable actuating bolt 158 may be rotated in the opposite direction as that required to lock the toolholder 10 and, as a result, the bolt 158 and the bolt nut 159 move apart from one another until the nut 159 contacts a shoulder 163 within the bore 161. At that time, the nut 159 may no longer move down and the actuating bolt 158 is thereby forced upwardly. The bolt 158 has a bump-off surface 215 while the male quick change portion 205 includes at least one releasable segment 217 defined by at lease one angled rearwardly facing surface 154 which engages the bump-off segment 215 and is displaced to the right. As a result, the first toolholder 10 is forcibly ejected from the second toolholder 115.

A method for attaching a first toolholder 10 to a second toolholder 115 involves the steps of rotating the quick change connector 120 such that the threads 45 partially engage the threaded receiving bore 47 of the first toolholder 10 (FIG. 8). Thereafter, the male quick change portion 140 of the quick change connector 120 may be inserted into the side activated receiver 125 of the second toolholder 115. The first toolholder 10 should be rotated relative to the second toolholder 115 to a relative pre-determined radial alignment where the alignment pin 30 is generally aligned with the alignment slot 180. At this point, the bolt 158 may be rotated such that the bolt 158 and the nut 159 are drawn together thereby engaging the lockable surface 148 of the male quick change portion 140 while still maintaining the pre-determined radial alignment. As illustrated in FIG. 9, the bolt 158 is then rotated further such that the angled rearwardly facing surfaces 164 contact the angled forwardly facing surfaces of the quick change connector 120 and draw the first toolholder 10 within the second toolholder 115.

Throughout this description, the term toolholder has been used to describe the two mating components. It should be appreciated that this term, as used herein, may describe any variety of attachments used to secure a cutting tool to a machine tool. While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A method for attaching a first toolholder having a threaded first receiving bore, wherein the threaded receiving bore is mateable with a male threaded portion at one end of a separate connector, with a second toolholder having a second receiving bore along a longitudinal axis for receiving a male quick-change portion located at the other end of the connector and wherein the first toolholder further includes a side activated receiver comprised of a rotatable actuating bolt positioned within the second toolholder along a radial axis (R1) relative to the longitudinal axis and having a first end with a bolt locking segment which translates along the radial axis and contacts a lockable surface of the connector adapted to secure the connector within the second toolholder, wherein the method is comprised of the steps of:

a) screwing the male threaded portion of the connector partially into the threaded receiving bore of the first toolholder;

b) inserting the male quick-change portion of the connector into the bore with the side activated receiver of the second toolholder;

c) rotating the first toolholder relative to the second toolholder to a relative predetermined radial alignment; and d) activating the quick change locking mechanism to secure first toolholder to the second toolholder in the predetermined radial alignment with the connector therebetween.

2. The method according to claim 1, wherein the male quick-change portion of the connector is comprised of a round shank and the bolt locking segment has a pair of lockable surfaces at circumferentially spaced locations.

3. The method according to claim 2, wherein the male quick change portion further includes at least one releasable segment defined by at least one angled rearwardly facing surface which may be engaged to eject the quick-change portion from the toolholder.

4. The method according to claim 3, where the male quick-change portion has a frusto-conical shape.

5. The method according to claim 1, wherein the lockable surfaces of the locking segment have forwardly facing surfaces which are conical.

6. The method according to claim 1, wherein the bolt locking segment is defined by at least one angled rearwardly facing surface which contacts the lockable surface of the connector.

* * * * *